United States Patent [19]
Fischle et al.

[11] Patent Number: 4,941,544
[45] Date of Patent: Jul. 17, 1990

[54] BEARING ARRANGEMENT FOR A DRIVE ASSEMBLY OF A MOTOR VEHICLE

[75] Inventors: Rüdiger Fischle, Leonberg; Ulrich von Broock, Hoxter, both of Fed. Rep. of Germany

[73] Assignee: Dr. Ing.h.c.F. Porsche AG, Fed. Rep. of Germany

[21] Appl. No.: 358,405

[22] Filed: May 30, 1989

[30] Foreign Application Priority Data

May 30, 1988 [DE] Fed. Rep. of Germany ....... 3818302

[51] Int. Cl.⁵ ............................ B60K 5/04; B60K 5/12
[52] U.S. Cl. ...................................... 180/292; 180/297
[58] Field of Search ............... 180/292, 297, 300, 312; 123/198 A, 198 E; 248/635, 637, 638

[56] References Cited

U.S. PATENT DOCUMENTS

| | | | |
|---|---|---|---|
| 3,402,782 | 9/1968 | Ljungström | 180/300 X |
| 3,825,090 | 7/1974 | Runkle et al. | 180/292 |
| 4,610,421 | 9/1986 | Ohta et al. | 180/297 X |
| 4,667,764 | 5/1987 | Sawada et al. | 180/297 |
| 4,709,779 | 12/1987 | Takehara | 180/300 |
| 4,730,584 | 3/1988 | Jördens et al. | 180/300 X |
| 4,779,701 | 10/1988 | Tsuchiya et al. | 180/297 X |

FOREIGN PATENT DOCUMENTS

| | | | |
|---|---|---|---|
| 1069004 | 11/1959 | Fed. Rep. of Germany . | |
| 3202256 | 7/1983 | Fed. Rep. of Germany . | |
| 3331417 | 3/1984 | Fed. Rep. of Germany | 180/297 |
| 3621317 | 1/1987 | Fed. Rep. of Germany | 180/300 |
| 0202110 | 11/1983 | Japan | 180/297 |
| 2183572 | 6/1987 | United Kingdom . | |

Primary Examiner—Richard A. Bertsch
Assistant Examiner—Brian L. Johnson
Attorney, Agent, or Firm—Evenson, Wands, Edwards, et al.

[57] ABSTRACT

A bearing arrangement for a drive assembly of a motor vehicle, particularly for a transverse three-cylinder engine, holds the drive assembly on the body side utilizing several bearings as well as a torque support. A central bearing is arranged below a horizontal plane extending through a center of gravity of the assembly, the torque support being located above this horizontal plane. The central bearing and the torque support are arranged approximately at a common vertical transverse plane extending through the center of gravity, and a support bearing is held on the front end of the assembly and is supported with respect to the vehicle body.

4 Claims, 1 Drawing Sheet

BEARING ARRANGEMENT FOR A DRIVE ASSEMBLY OF A MOTOR VEHICLE

BACKGROUND AND SUMMARY OF THE INVENTION

The present invention generally relates to a bearing arrangement and more particularly to a bearing arrangement using few assembly bearings and particularly adapted for use with a three cylinder engine.

German Published, Unexamined Patent Application (DE-OS) 33 31 417 discloses a bearing arrangement for a drive assembly of a motor vehicle which has three bearings and two torque supports, two opposite bearings being arranged in the area of a main inertia axis extending through the center of gravity of the assembly. Because of the additional bearings provided next to the inertia axis and the torque supports, this type of an arrangement requires high structural expenditures, and a coordination of the bearings with respect to one another corresponding to their function which requires relatively high expenditures because the bearing sites are located far apart and at a distance with respect to the axis of inertia It is an object of the present invention to provide a bearing arrangement utilizing a small number of assembly bearings which compensates for the special vibration behavior of a three-cylinder engine; i.e., they are located in low-vibration areas and, each separately can be adapted to a main load type.

Main advantages achieved by preferred embodiments of the present invention are that, as a result of the arrangement of a central bearing, which carries almost the complete static load, and a torque support in the low-vibration area, very low vibration levels occur at the bearing elements which essentially hold the assembly when the engine is standing as well as when subjected to a load.

With the single central bearing arranged underneath the engine, a vertical support base for the engine torque can be achieved that is as large as possible, with respect to the torque support fastened at a cylinder head of the engine. As a result the forces to be supported are so low that the vehicle does not experience any unpleasant longitudinal bucking or vibrational shaking caused by load changes.

For vibration-technological reasons, the rubber elements are arranged as closely to the assembly as possible in order to avoid increases of vibration due to long lever arms and resonances of the bearing supports. For the supporting of the torque, the geometry of the engine is utilized; i.e., almost the entire overall height of the engine.

The support bearing is arranged at the front end of the engine because, in comparison to the front end of the transmission, lower vibration levels occur at the front of the engine in the case of a three-cylinder engine and, in addition, no transmission noises are transmitted.

The stiffness of the bearing element at the support bearing, in vertical as well as in driving direction, may be designed to be very soft, since the support load is very low and it does not have to support any torque. Since the center of gravity of the assembly is located almost in one plane with the central bearing and the torque support, no significant inertial forces occur at the support bearing during acceleration and deceleration.

Other objects, advantages and novel features of the present invention will become apparent from the following detailed description of the invention when considered in conjunction with the accompanying drawings.

DETAILED DESCRIPTION OF THE DRAWINGS

Figure 1:
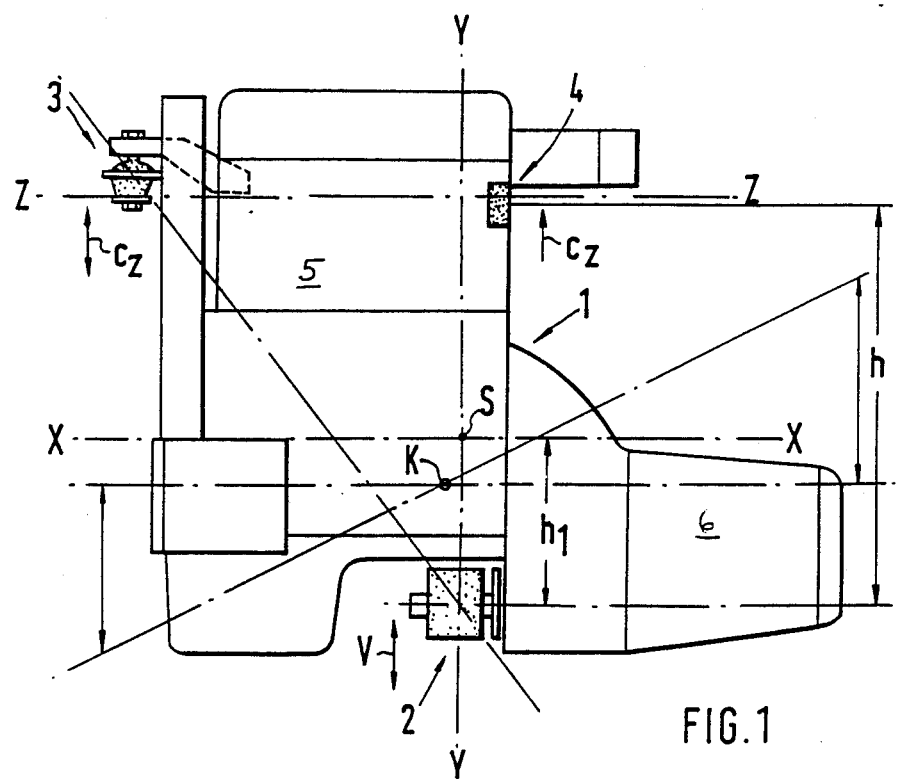
FIG. 1 is a front view of a drive assembly with a central bearing a support bearing and a torque support in accordance with one embodiment of the present invention.

An embodiment of the invention is shown in the drawing and will be explained in detail in the following.

A drive assembly 1, including an engine 5, particularly a three-cylinder engine, and a transmission 6, is held at a vehicle body by a support arrangement including two bearings 2 and 3 and one torque support 4.

A central bearing 2 is arranged at the engine 5 below a horizontal plane X—X extending through the center of gravity S of the assembly 1, with the torque support 4 arranged above this plane at the cylinder head cover. The central bearing 2 as well as the torque support 4 are provided in a low-vibration zone, the area of which is located approximately in a vertical plane Y—Y extending through the center of gravity S, in which the bearing 2 and the torque support 4 are held at a relatively large distance or base h.

Figure 2:
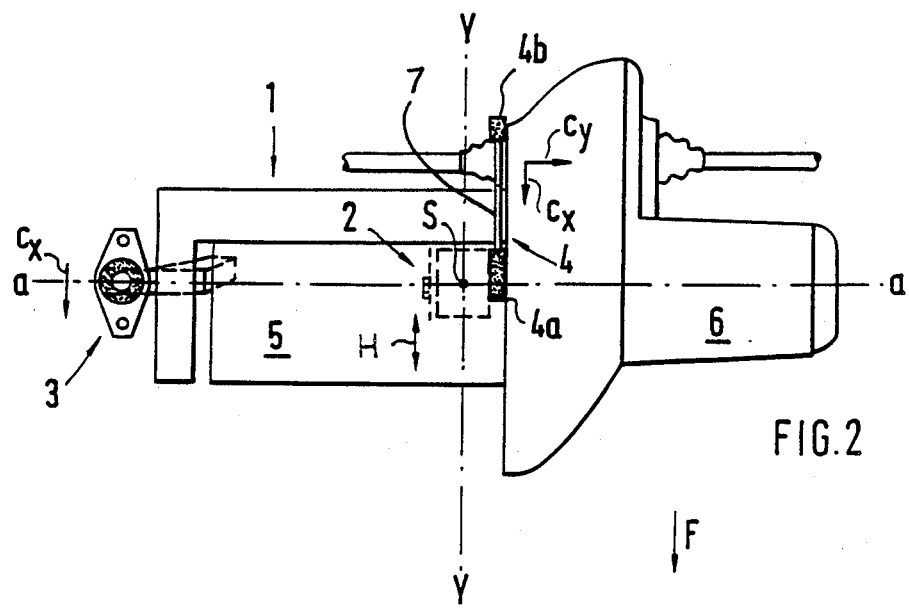
FIG. 2 is a top view of the drive assembly with the bearing arrangement according to FIG. 1.

The support bearing 3 is arranged at the front end of the engine 5, this support bearing 3, with respect to the front view of FIG. 1, being located diagonally opposite the central bearing 2. In particular, the support bearing 3 is disposed in a vertical longitudinal plane a—a (FIG. 2) which extends through the center of gravity S.

In an in-line three-cylinder engine, the rotating moments of inertia of the first degree will dominate, causing the engine to carry out a gyratory elliptic motion. The center point K of the assembly vibrations is located almost at the assembly center, and the vibration level increases almost linearly outwardly from point K in vertical and horizontal position, as indicated by arrows V and H in FIGS. 1 and 2.

This special vibration behavior of the three-cylinder engine results in the arrangement of the bearing 2 and of the torque support 4 as well as of their loads. Thus, almost the whole static assembly load is absorbed by the central bearing 2. The torque is supported only by the central bearing 2 and the torque support 4. The support bearing 3 at the front end of the engine 5 has the purpose of securing the assembly with respect to a tipping.

Since the central bearing 2, in addition to the static forces and the dynamic forces caused by the road, must also absorb the engine torque in connection with the torque support 4 and is also used for the disconnecting of idling jolts, this central bearing 2 which may, for example, be constructed as a bush bearing, has a defined free path for the disconnecting of the idling jolts. In the case of short vibrating paths in driving direction F, it has a relatively low stiffness and for vibrations with a larger amplitude, the central bearing 2 becomes stiffer, with the rise in stiffness being progressive. A central bearing 2 exhibiting this stiffness characteristic is conventional and well known.

The torque support 4 comprises a tension/pressure strut 7 held in elastic bearings 4a and 4b between the cylinder head and a wall of the vehicle body. In longitudinal direction $c_x$, the bearings 4a and 4b also have a progressive course of stiffness, such that with short vibrating paths there is a relatively low stiffness, and with larger vibrating paths, the bearings are stiffer. In vertical and transverse direction $c_z$, $c_y$, the torque support 4 exhibits only a slight stiffness.

The support bearing 3 supports almost no engine torque as well as no inertial forces and may therefore be constructed to be relatively soft in driving direction $c_x$ as well as in vertical direction $c_z$.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A bearing arrangement for a drive assembly of a motor vehicle which is held on a body side of the vehicle comprising:
   a central bearing means arranged below a horizontal plane extending through a center of gravity of the drive assembly;
   a torque support means arranged above the horizontal plane, the central bearing means and the torque support means being arranged approximately at a common vertical transverse plane extending through the center of gravity; and
   a support bearing means held on a front end of the assembly and supported with respect to the vehicle body;
   wherein the central bearing means is arranged below the center of gravity and in a low-vibration area of the drive assembly, the central bearing means being a single bearing which absorbs substantially an entire static load of the drive assembly;
   wherein the torque support means is arranged with respect to the central bearing means at a base distance which corresponds to approximately an overall height of the drive assembly, and with the central bearing means being located substantially at the vertical plane extending through the center of gravity; and
   wherein the support bearing means, with respect to a front view of the vehicle, is arranged diagonally opposite the central bearing means at a vertical longitudinal plane extending through the center of gravity.

2. A bearing arrangement according to claim 1, wherein the support bearing means, in a vertical direction and in a forward driving direction, has a relatively soft spring characteristic.

3. A bearing arrangement according to claim 2, wherein the central bearing means, in a forward driving direction of the vehicle, has a two-step spring stiffness characteristic such that in the case of short vibrating paths, the central bearing means is soft and in the case of a high amplitude vibration path, the central bearing means is progressively stiffer.

4. A bearing arrangement according to claim 3, wherein the drive assembly includes a three-cylinder engine.

* * * * *